Dec. 20, 1927.

A. J. DESLAURIERS 1,653,261

MILK CAN COVER

Filed Aug. 10, 1925

Inventor
Albert J. Deslauriers
By H. C. Johnson
Attorney

Patented Dec. 20, 1927.

1,653,261

UNITED STATES PATENT OFFICE.

ALBERT J. DESLAURIERS, OF ST. PAUL, MINNESOTA.

MILK-CAN COVER.

Application filed August 10, 1925. Serial No. 49,265.

The present invention relates to a cover retainer for milk cans.

In the normal use of a milk can the cover thereof is apt to become separated from the can and either lost or damaged.

An object of the present invention is to connect a cover to a milk can by means which will permit the milk can cover to be removed from the neck opening of a milk can and still be retained from complete separation from the can.

In order to attain this object there is provided, in accordance with one feature of the invention, an opening in the flange of the milk can cover and a second opening in the flange of the top of the milk can, the openings being positioned to be in register with each other when the cover is closely fitted within the neck opening of the milk can. A chain, of a size to pass freely through the opening in the milk can cover and that in the milk can, is provided with enlarged links at either end thereof. Each of the enlarged end links is provided with laterally extending prongs which engage the sides of the openings in the milk can cover and in the upper portion of the can to prevent the passage therethrough of the end links of the chain.

These and other features of the invention not specifically mentioned, will be more fully brought out in the following description and the accompanying drawings, wherein.

Figure 1:
Figure 1, is a view in isometric perspective of the upper portion of a milk can, the cover thereof being partially removed and the flexible connection intermediate the cover and the can being shown positioned in openings in the cover and in the can.

Referring to the drawings in detail, a milk can A of a conventional type, is provided with an opening 1 in the flange at the upper portion thereof. A second opening 2 is provided in cover 3 in a position to register with the opening 1 in the milk can when the cover is closely inserted within the neck of the milk can. A chain B is provided with enlarged end links 4, the end portions 5 of the enlarged links being bent to extend laterally from the end links 4 to act as an anchor to prevent the passage of the end links through openings in the cover and in the can. The chain is first assembled with an end link similar to the right hand end link in Figure 2, the link shown on the left end of the chain in Figure 2 being left off the chain while the chain is inserted through the openings 1 and 2 of the milk can and cover. The other end link 4 is then passed through the link of the chain proper to the position shown by the left hand link in Figure 2. The opening 6 intermediate the horizontal portions of the link 4 are then forced together to the position shown by the right hand link in Figure 2. This closes the link and prevents its removal from the chain.

Figure 2:
Figure 2, is a view in elevation of the flexible connecting means.
Figure 3:
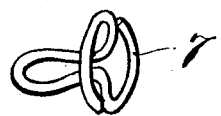
Figure 3, is a view in isometric perspective of a modified form of an enlarged end link.

A modified form of end link 7, shown in Figure 3, may be connected to the chain in the same manner as the links 4 illustrated in Figures 1 and 2, the link 7 illustrated by Figure 3 being designed to more effectually anchor the chain in the openings 1 and 2 in the milk can and cover.

What I claim is:

In combination with a milk can having a neck with a flared part and a cover having a flanged top disposed above the flared part of the neck, each of said parts having an opening, the opening of the flared part of the neck being located below the top thereof, the openings being adapted to register in closed position of the cover, a chain having each of its ends free and extending loosely through each of the openings and an anchor on each end of the chain, each of said anchors being pliable and having parts thereof extending through the end links of the chain and having outwardly extending parts providing abutments of greater diameter than the openings so as to prevent movement of the chain ends out of the respective openings, the opening of the flared part of the neck being of a size to allow the chain to freely gravitate therethrough and lie loose below the neck opening when the cover is in closed position.

In testimony whereof I affix my signature.

ALBERT J. DESLAURIERS.